United States Patent Office

3,642,951
Patented Feb. 15, 1972

3,642,951
ETHYLENE PROPYLENE BLOCK COPOLYMER AND A 2-STEP METHOD FOR PRODUCING SAME
Iso Shirai, Kouichi Kunimune, and Masaaki Muraki, Higashi, Ichiharashi, Japan, assignors to Chisso Corporation, Osaka-shi, Japan
No Drawing. Filed Sept. 16, 1968, Ser. No. 762,336
Claims priority, application Japan, Sept. 23, 1967, 42/61,112
Int. Cl. C08f 15/04
U.S. Cl. 260—878                     1 Claim

ABSTRACT OF THE DISCLOSURE

A process for preparing an ethylene propylene block copolymer of improved anti-stress cracking characteristics in the presence of one of several composite catalyst systems which comprises the steps of (1) polymerizing (a) propylene or (b) propylene containing ethylene in an amount less than that of the propylene so that the amount of ethylene in the first segment of the copolymer is not greater than 5%, in an organic solvent and in the presence of the catalyst, (2) lowering the concentration of the unreacted propylene monomers in the said solvent and (3) continuing the polymerization reaction by supplying ethylene to form the second segment of the copolymer. The resulting block copolymer contains the first segment in an amount of 3–40% by weight and the second segment in an amount of 97–60% by weight.

BACKGROUND OF THE INVENTION (1) Field of the invention

This invention relates to a block copolymer and a method for producing same. More particularly, it relates to an ethylene-propylene block copolymer which has an improved anti-stress-cracking property superior to that possessed by common polyethylene.

(2) Description of the prior art

In spite of many superior properties such as shock resistance, non-embrittlement at low temperature or the like, polyethylene is inferior in its anti-stress-cracking property, which inferiority is often a fatal drawback in some applications.

Accordingly, it is an object of the present invention to provide a block copolymer of ethylene and propylene having a superior anti-stress-cracking property and retaining almost all of the inherent superior properties of polyethylene.

The anti-stress-cracking property of polyethylene is greatly influenced by its melt-flow index. It is known that the lower the melt-flow index, the better the anti-stress-cracking property.

It is another object of the present invention to provide a block copolymer of ethylene and propylene having a greatly improved anti-stress-cracking property compared with that of the polyethylene having the same melt-flow index.

It is a further object of the present invention to provide a block copolymer of ethylene and propylene containing lesser amount of ash.

Further objects and other advantages of the present invention will be apparent from the description which follows.

SUMMARY OF THE INVENTION

According to the present invention, a block copolymer of ethylene and propylene is prepared by polymerizing propylene or propylene and ethylene in the presence of a composite catalyst containing, as catalyst ingredients, $TiCl_3 \cdot \frac{1}{3}AlCl_3$ and diethyl aluminum mono chloride (hereinafter referred to as DEAC), and in the presence of an inert organic solvent to form the first segment containing 0 to 5% by weight of ethylene unit and continuing the polymerization by supplying ethylene, having controlled the concentration of propylene in the above-mentioned solvent at a value of less than 5% by weight (as measured by gas chromatography), to form the second segment in such a way that resultant block copolymer contains the first segment in an amount of 3–40% by weight and the second segment in an amount of 97–60% by weight.

There is description in U.S. Pat. No. 3,296,338, that after polymerization of a first feed of propylene in an inert solvent, a second feed selected from the group consisting of ethylene and a mixture of ethylene and propylene, is block-copolymerized without driving off unreacted monomer of the feed from the polymerization system. The resultant block copolymer has improved shock-resistance and brittle point as compared with those of polypropylene itself. In order to achieve these properties, it is reported that the amount of the above-mentioned two feeds must be in any case controlled so as to give the ethylene content of about 3–15% relative to the total polymer consisting of pentane soluble and insoluble polymers.

In contrast to the above-mentioned prior art block copolymer, the present invention is directed to the production of a block copolymer (modified polyethylene) having an anti-stress-cracking property superior to polyethylene of the same grade of melt-flow rate. In order to achieve the above-mentioned purpose, it has been now discovered that the first segment of propylene polymer containing 0–5% by weight of ethylene is formed first, then the concentration of propylene in the solvent is controlled to an extent of from about 0.01% to a measurable amount of less than 5%, preferably from about 0.3 to about 3% and, at such a state, forming the second segment of ethylene polymer.

The proportion of the first segment in the total block copolymer is limited to 3–40% by weight. Of course, there is also an amount outside of this range where anti-stress-cracking property is improved. But a drawback is found in the range of less than 3% by weight that bulk density of resultant copolymer is exceedingly increased and another drawback is found in the range of more than 40% that elongation suddenly falls. Accordingly, the range of lower than 20% is preferred where tensile impact strength is not also so lowered. This first segment may consist of polypropylene alone but those containing less than 5% of ethylene can also achieve the object of the present invention. However, if the amount of ethylene is more than 5%, the ratio of solvent-soluble-polymer in the resultant block copolymer tends to increase.

In the formation of the second segment, a control is carried out so as to provide the concentration of propylene in a solvent at less than 5%. The reason of the limitation to 5% is for the purpose of preventing the crystallinity of polypropylene from being substantially reduced and the solvent soluble polymer, i.e. rubbery substance, from forming.

The polymerization reaction is carried out in an inert organic solvent by using a composite catalyst consisting of $TiCl_3 \cdot \frac{1}{3}AlCl_3$ and diethyl aluminum monochloride. Since the first segment is formed by the polymerization of propylene, $TiCl_3 \cdot \frac{1}{3}AlCl_3$ which has been known as an excellent catalyst component for the polymerization of propylene, is used. As an additional catalyst component, a polyether or an organic silicon compound such as tetralkyl silicate having 1 to 4 carbon atoms can be used together with the above-mentioned two components.

The first segment-forming-reaction is carried out at a polymerization temperature of 40–90° C., preferably 50–70° C. and at a polymerization pressure ranging from atmospheric to 50 kg./cm.$^2$ gauge preferably from 3–10 kg./cm.$^2$ gauge and if necessary the reaction is advanced with the addition of gaseous hydrogen so as to control the molecular weight of polymer. In this case, ethylene monomer can be added so that resultant segment contains less than 5% by weight of ethylene unit. It is preferable that the addition of ethylene is carried out intermittently. After this reaction is continued for a definite period of time, unreacted propylene monomer is removed so as to make the propylene concentration in the solvent lie in the practical existing amount of less than 5% (as measured by vapor phase chromatography). Thereafter ethylene monomer is fed in the polymerization system to add to and form the second segment while maintaining polymerization temperature from the room temperature to 100° C., preferably from 70 to 95° C., polymerization pressure from the atmospheric to 100 kg./cm.$^2$ gauge, preferably from 4 to 10 kg./cm.$^2$ gauge and adding a definite amount of hydrogen gas to control the melt-flow-index of the product.

The resultant block copolymers have an improved anti-stress-cracking property which for the most part do not sacrifice the preferable inherent physical properties of polyethylene. It can be said that improvement has been achieved without sacrificing such preferable properties as density, rigidity or the like of high density polyethylene, compared with the case of a random copolymer having the same ratio of ethylene and propylene.

Further there is no such a drawback as the reduction of tenacity and elongation at welded parts which is often encountered in the block copolymer having polyethylene segment and polypropylene segment. In case of the last-mentioned copolymer, the above-mentioned drawback becomes pronounced with the increase of propylene content over a definite amount. In case of the block copolymer of the present invention wherein two types of copolymers are simultaneously used, advantage can be found in that the proportion of propylene can be selected in a relatively wider range.

Another characteristic point of the present block copolymer is the improvement in its anti-stress-cracking property. In the case of polyethylene, one method for improving anti-stress-cracking is to reduce its melt-flow-index but the polyethylene of low melt-flow-index has a drawback in the point of inferior processability.

In contrast to this, the block copolymer of the present invention has superior anti-stress-cracking property to the polyethylene having the same melt-flow-index and yet its processability is not reduced. In other words, the block copolymer of the present invention is preferable with respect to the processability and physical properties of the product.

The block copolymer of the present invention contains lesser amount of ash than polyethylene. This is also a characteristic property of the present block copolymer.

DESCRIPTION OF THE PREFERRED EMBODIMENTS

Following examples are offered by way of illustration but not by way of limitation, all parts and percent are by weight.

Example 1

After a 1 liter stainless steel reactor of electromagnetic revolving type is sufficiently dried, it was flushed with nitrogen gas three times to essentially completely substitute air in this vessel. 700 ml. of purified hexane was introduced under the atmosphere of nitrogen in the vessel and subsequently 300 mg. of diethyl aluminum monochloride, 200 mg. of TiCl$_3$·⅓AlCl$_3$ and 0.2 mg. of diethylene glycol dimethyl ether were added in this order with stirring to form a suspension. After the temperature is raised to 70° C., 200 ml. of hydrogen gas (normal condition) are added, and a feed of propylene monomer is continued with the control of the internal pressure of the reactor at 4 kg./cm.$^2$. Twenty minutes later, the feed of propylene monomer is suspended, the greater part of the propylene monomer in the vessel is removed by dropping the pressure and the propylene concentration in the solvent of n-hexane was made to 1.1% (as measured by vapor phase chromatography).

Then temperature was raised to 90° C. and after addition of 2500 ml. of hydrogen gas, the feed of ethylene monomer was continued so as to keep the internal pressure of the reaction vessel at 10 kg./cm.$^2$ gauge and the polymerization reaction was continued for 2 hours. After the completion of reaction, unreacted monomer in the reactor was removed by dropping of pressure, and 100 ml. of methanol were added to kill the catalyst. Then resultant powder was filtered and 1 liter of methanol-water mixed solution (1:1) containing 0.5% of caustic soda was added at 50° C. for 20 minutes to effect neutralization. Subsequently, filtration, washing and vacuum drying were carried out.

The resultant block copolymer was a powder yield of 152 g. The propylene content as measured by I.R. spectrum was 5.6%, the melt-flow-index (at 190°) was 2.4, the bulk density of powder was 0.410, and density was 0.948. Tensile impact strength as measured by an impact tester of Toyo-Seiki Co. at 0° C. was 208 kg. cm./cm.$^2$. When anti-stress-cracking property was measured in methanol, a value of 80 hours was obtained. The measurement of anti-stress-cracking was carried out under the following conditions:

apparatus: water vessel of thermostat 50° C.±0.5° C.
environment agent: 200 ml. of methanol
form of sample: 38 mm. x 10 mm. x 2 mm.
slit: depth—03–0.5 mm.; length—19 mm.
standard for judgement: number expressed by hour elapsed until 5 pieces among 10 specimens develop cracks Control 1a.—The polymerization reaction of ethylene was carried out with the same conditions as in the reaction of Example 1 excepting that the polymerization of propylene in the first step was not carried out and coexistence of propylene in the solvent used in the second step of ethylene polymerization was excluded. Yield of polyethylene powder obtained was 97 g. Its melt-flow-index (at 190° C.), bulk density, density, and tensile impact strength were, 2.0, 0.250, 0.955 and 213 kg. cm./cm.$^2$, respectively. When anti-stress-cracking property was measured in methanol, a value of 9 hours was obtained.

Control 1b.—The polymerization reaction was carried out in the same conditions as in the reaction of Example 1 excepting that the polymerization of propylene in the first step was not carried out. Namely, the reaction was carried out with the propylene concentration of 1.1% in the n-hexane used as a solvent, whereby 89 g. of powder were obtained.

Propylene content, melt-flow-index (at 190° C.), bulk density, density and tensile impact strength of this powder were 0.6%, 2.6, 0.210, 0.950 and 238 kg. cm./cm.$^2$, respectively. The anti-stress-cracking property as measured in methanol was a value of 47 hours.

Example 2

The polymerization reaction was carried out at the same conditions as in the reaction of Example 1 excepting that diethylene glycol dimethyl ether was not used as one component of catalyst, the polymerization time of propylene monomer in the first step was 40 minutes, the amount of hydrogen gas added was 0, the propylene concentration in the solvent of n-hexane in the second step of the reaction was 0.6%, the amount of hydrogen gas added was 1800 ml., and the internal pressure of the reaction vessel was 9 kg./cm.² gauge. 172 g. of powder were obtained.

The propylene content, the melt-flow-index (at 190° C.), the bulk density, the density and the tensile impact strength of the resultant block copolymer were, 5.4%, 0.5, 0.405, 0.945 and 389 kg. cm./cm.², respectively. When the anti-stress-cracking property was measured in methanol, a value of 432 hours was obtained.

Control 2.—The preparation of polyethylene was carried out as in Control 1a but as for the polymerization condition, the same conditions as in Example 2 which is applicable to the instant case were used, whereby 113 g. of powder were obtained.

The melt-flow index (at 190° C.), the bulk denisty, the density, and the tensile impact strength were 0.43, 0.224, 0.950, and 402 kg. cm./cm.², respectively. When the anti-stress-cracking property was measured in methanol, a value of 46 hours was obtained.

Example 3

The polymerization reaction was carried out under the same conditions as in Example 1 excepting that polymerization time of propylene monomer in the first step was 30 minutes, added hydrogen gas was 100 ml., propylene concentration in n-hexane solvent in the second step reaction was 0.9%, and the volume of added hydrogen gas was 2,000 ml., whereby 158 g. of powder were obtained.

Propylene content, melt-flow index (at 190° C.), bulk density, the density, and the tensile impact strength of the resultant copolymer was 10.1%, 1.4, 0.415, 0.945, and 305 kg. cm./cm.², respectively. When the anti-stress-cracking property was measured in methanol (at 50° C.), a value of 128 hours was obtained. When the same property was measured in 5% aqueous solution of Liponox NCI (the product of Lion Fat-and-Oil Co., Ltd.) (at 50° C.), the value was 85 hours.

Control 3.—Preparation of polyethylene was carried out as described in Control 1a, but as for the polymerization condition, those conditions were used which were used in Example 3 and are also applicable to the instant case, whereby 108 g. of powder were obtained.

The melt-flow index, the bulk density, the density and the tensile impact strength of thus-obtained powder were 1.6, 0.240, 0.957, and 318 kg. cm./cm.², respectively. When the anti-stress cracking property was measured in methanol (at 50° C.), a value of 15 hours was obtained. When the same property was measured in 5% aqueous Liponox solution NCI (at 50° C.), the value was 7 hours.

Example 4

The polymerization reaction was carried out under the same conditions as described in Example 1 excepting that diethylene glycol dimethyl ether, one of the components of the catalyst used in the reaction of Example 1, was not used, polymerization time of propylene monomer on the first step was 30 minutes, concentration of propylene in n-hexane solvent on the second step reaction was 2.3%, and volume of added hydrogen gas was 2,800 ml., whereby 138 g. of powder were obtained.

The propylene content, the melt-flow index (at 190° C.), the bulk density, the density, and the tensile impact strength of thus-obtained copolymer were 9.9%, 4.1, 0.395, 0.942, 187 kg. cm./cm.², respectively. When the anti-stress cracking property was measured in methanol (at 50° C.), a value of 48 hours was obtained, the same property measured in 5% aqueous Liponox solution (at 50° C.) being 31 hours.

Control 4.—The preparation of polyethylene was carried out in the same manner as described in Control 1a, but as for the polymerization conditions, those conditions which were used in Example 4 and are also applicable to the instant case were used, whereby 92 g. of powder were obtained.

The melt-flow index (at 190° C.), the bulk density, the density, and the tensile impact strength of thus-obtained powder were 4.4%, 0.234, 0.960, and 179 kg. cm./cm.², respectively. When the anti-stress cracking property was measured in methanol (at 50° C.), a value of 4 hours was obtained, the same property measured in 5% aqueous solution of Liponox NCI (at 50° C.) being 1 hour.

Example 5

A 10-liter pressure reactor of electro-magnetic revolving type was utilized. In the same manner as described in Example 1, the air in the vessel was replaced by nitrogen gas, and 8 liters of the purified n-hexane was introduced into the vessel under the nitrogen atmosphere. To this, 4.2 g. of diethyl aluminum monochloride and 2.5 g. of TiCl₃·⅓AlCl₃ were added. The mixture was then heated to 70° C. and polymerized for 30 minutes, during which time stirring (500 r.p.m.) was continued and propylene monomer was being fed up to 3 kg./cm.² gauge. Thereafter, the unreacted monomer was, for the most part, removed by dropping the pressure, and propylene concentration in n-hexane was adjusted to 1.2%. Twenthy liters of hydrogen gas was then added with pressure, and polymerization reaction was continued for a period of 2 hours, during which time ethylene gas was being fed at the temperature of 90° C. while controlling the internal pressure of the reaction vessel so as to keep it at 10 kg./cm.² gauge. After the completion of the reaction, both the hydrogen gas and the residual monomer gas were removed by dropping the pressure. Methanol (1.5 liters) was added to the reaction mixture under the nitrogen atmosphere, and the mixture was heated to 85° C. and maintained at that temperature for 30 minutes to kill the catalyst. The mixture was then filtered and the resulting powder was placed into another 10-liter vessel. Two liters of methanol containing 0.5% caustic soda and 7 liters of a mixture of methanol-water (1:1) were poured into the vessel, and the neutralization was carried out by maintaining the mixture at 60° C. for 30 minutes. The mixture was filtered and the resulting powder was washed with methanol and dried by hot wind, whereby 1,376 g. of powder were obtained.

The propylene content, the melt-flow index, the bulk density, the density, and the tensile impact strength of thus-obtained copolymer were 8.3%, 2.8, 0.434, 0.947, 241 kg. cm./cm.², respectively. The flexural modulus measured by stiffness tester of Toyo Seiki Co. was 35 x 10³ kg./cm.², and the hardness measured by hardness testor of Toyo Seiki Co. was 98.0. Ash was 135 p.p.m. The anti-stress cracking property was 74 hours when measured in methanol (at 50° C.), whereby a value of 46 hours was obtained when measured in 5% aqueous solution of Liponox NCI (at 50° C.).

Example 6

A 1-liter stainless steel reactor of electromagnetic revolving type was utilized. In the same manner as described in Example 1, the air was replaced by nitrogen gas. In this vessel, 350 mg. of diethyl aluminum chloride, 250 mg. of TiCl₃·⅓AlCl₃, and 0.4 mg. of diethylene glycol dimethyl ether were placed in this order. After the mixture was heated to 70° C. and 200 ml. of hydrogen gas were added, propylene monomer was fed, while controlling the internal pressure of the vessel so as to keep it at 4 kg./cm.² gauge. Five minutes later, 2 g. of ethylene monomer were added to the mixture over the period of 10 minutes, and further polymerization was continued for another 15 minutes, during which time propylene monomer was being fed. Then, the residual monomers in the vessel (i.e., propylene monomer containing a small amount of ethylene monomer) were removed for the most part by dropping the pressure, and the concentration of propylene in n-hexane solvent was adjusted to 0.8%. Ethylene was scarcely detected.

The mixture was then heated to 90° C., and 2500 ml. of hydrogen gas were added. Polymerization reaction was continued for 2 hours, during which time ethylene monomer was being fed, while controlling the internal pressure of the vessel to keep at 10 kg./cm.² gauge. After the completion of the reaction, the unreacted monomer in the vessel was removed by dropping the pressure. To the reaction mixture 100 ml. of methanol was added, and the mixture was worked up in the same manner as described in Example 1, whereby 140 g. of powder of copolymer were obtained.

The propylene content, the melt-flow index (at 190° C.), the bulk density, the density, and the tensile impact strength of thus-obtained copolymer were 12.4%, 3.1, 0.385, 0.945, 231 kg. cm./cm.², respectively. When the anti-stress-cracking was measured in methanol (at 50° C.), a value of 92 hours was obtained.

What is claimed is:

1. A process for the preparation of block copolymers of ethylene and propylene using a composite catalyst selected from the group consisting of $TiCl_3 \cdot \frac{1}{3}AlCl_3$ and diethyl aluminum monochloride; $TiCl_3 \cdot \frac{1}{3}AlCl_3$, diethyl aluminum monochloride and diethylene glycol dimethyl ether; and $TiCl_3 \cdot \frac{1}{3}AlCl_3$, diethyl aluminum monochloride and tetraalkyl silicate, each alkyl having 1 to 4 carbon atoms, which comprises (a) polymerizing propylene alone, or propylene containing ethylene in an amount less than that of propylene and necessary to form a first segment of the block copolymer containing 0 to 5% by weight of ethylene unit, in an inert organic solvent and in the presence of said composite catalyst system at a temperature of from about 40° C. to 90° C. and at a pressure of from about one atmosphere to about 50 kg./cm.² gauge, (b) lowering the concentration of unreacted propylene monomers in the inert solvent to a value less than 5% by weight (as measured by gas chromatography) by lowering the pressure in the polymerization system to remove the propylene or propylene containing ethylene and (c) continuing the polymerization reaction at a temperature of from about 21° C. to about 100° C. and at a pressure of from about one atmosphere to about 100 kg./cm.² gauge by supplying ethylene to form a second segment of the block copolymer in such a way that the resultant block copolymer contains the said first segment in an amount of 3–40% by weight and the second segment in an amount of 97–60% by weight.

References Cited
UNITED STATES PATENTS

| | | | |
|---|---|---|---|
| 3,200,173 | 8/1965 | Schilling | 260—878 |
| 3,268,624 | 8/1966 | Jezl et al. | 260—878 |
| 3,296,338 | 1/1967 | Jezl et al. | 260—878 |
| 3,358,056 | 12/1967 | Renaudo | 260—878 |

HARRY WONG, Jr., Primary Examiner

U.S. Cl. X.R.

260—93.7, 94.9